United States Patent [19]

Taylor et al.

[11] 4,424,315

[45] Jan. 3, 1984

[54] NAPHTHOL NOVOLAK RESIN BLEND

[75] Inventors: Paul Taylor, North Andover; Michael Gulla, Sherborn, both of Mass.

[73] Assignee: Shipley Company Inc., Newton, Mass.

[21] Appl. No.: 422,310

[22] Filed: Sep. 20, 1982

[51] Int. Cl.$^3$ .............................................. C08L 61/10
[52] U.S. Cl. .................................... 525/501; 525/934; 528/153
[58] Field of Search ................ 525/501, 934; 524/904; 528/165, 153, 148, 151

[56] References Cited

U.S. PATENT DOCUMENTS 2,462,253 2/1949 Booty ................................. 526/200
3,345,249 10/1967 Stephan ............................. 525/501

Primary Examiner—Theodore E. Pertilla

[57] ABSTRACT

This invention relates to resin blends of naphthol resins and novolak resins. Naphthol resins are acid catalyzed condensation products of an aromatic alcohol with an aldehyde where the aromatic alcohol is a naphthol or a mixture of a naphthol and a phenol. The blends of the invention preferably contain a total of from 5 to 35 mole percent repeating units derived from naphthol. The blends are useful as molding compounds or as film forming materials.

14 Claims, No Drawings

NAPHTHOL NOVOLAK RESIN BLEND

BACKGROUND OF THE INVENTION

1. Introduction

This invention relates to blends of resins formed from aromatic alcohols.

2. Description of the Prior Art

The formation of phenolic resins by the condensation of a phenol with an aldehyde is well known in the art and described in numerous publications including Kirk-Othmer, *Encyclopedia of Chemical Technology*, Volume 15, pages 176 to 208, 1968, incorporated herein by reference. Phenol itself is the phenol used in the greatest volume for the formation of phenolic resins, but resorcinol, alkyl substituted phenols such as cresols, xylenols, and p-tert-butylphenol and p-phenylphenol are used in substantial volume. The aldehyde used is almost exclusively formaldehyde but small amounts of acetaldehyde and furfuraldehyde are also used.

The condensation of a phenol with an aldehyde can be an acid catalyzed reaction with a molar ratio of phenol to aldehyde less than 1 or an alkaline catalyzed reaction with a molar ratio of phenol to aldehyde greater than 1. The acid catalyzed reaction yields thermoplastic resins which have come to be known as the Novolak resins while the alkaline catalyzed reaction yields thermosetting resins known as the Resole resins.

The Novolak resins have many commercial uses. Their primary use is as a molding compound, where they are molded to a desired configuration and then cured by cross-linking with a cross-linking agent such as hexamethylenetetraamine. Another use of the Novolak resins is as a film forming material. For this use, the resin is cast from solution and generally the cast film is not cured.

Conventional Novolak resins, prior to cure, have only moderate thermal stability and typically melt within a range of from about 90° C. to 120° C., dependent upon the composition of the resin and its molecular weight. There has been little effort to increase the stability of the thermoplastic Novolak resins to high temperatures because high thermal stability has not been considered to be an important property of a film forming resin.

A new class of resins formed by the condensation of a mixture of a naphthol and a phenol with an aldehyde is disclosed in copending U.S. patent application Ser. No. 6/374,054, filed May 3, 1982, assigned to the same assignee as the subject application, and incorporated herein by reference. These resins are copolymers formed by the aforesaid condensation of an aldehyde with an aromatic alcohol mixture of a naphthol and a phenol in the presence of an acid catalyst. The molar ratio of the naphthol to the phenol can vary from about 20 to 1 to 1 to 20, dependent upon the desired properties of the resin. These resins are especially useful as film formers where resistance to flow at elevated temperatures is a desired property.

SUMMARY OF THE INVENTION

The subject invention is directed to resin blends comprising naphthol and Novolak resins. The term "naphthol resin" is defined more broadly herein than in the aforementioned copending application. As used herein, the naphthol resins are defined as polymers formed by the condensation of an aldehyde with an aromatic alcohol selected from the group of naphthols and mixtures of naphthols with phenols in the presence of an acid catalyst. When the mixture of a naphthol with a phenol is used, the ratio of repeating units derived from the naphthol to repeating units derived from the phenol in the resin blend varies from about 20 to 1 to 1 to 20.

The term "Novolak resin" is used in accordance with its art-recognized meaning as polymers formed by the condensation of at least one phenol with an aldehyde in the presence of an acid catalyst.

The naphthol resins and the Novolak resins are compatible with each other and yield polymer mixtures exhibiting excellent film forming properties. Where the melting points of the naphthol resin and the Novolak resin are known, resin blends are readily prepared exhibiting any desired intermediate melt point by adjusting the concentration of each resin in the blend.

DESCRIPTION OF THE PREFERRED EMBODIMENT

As aforesaid, the naphthol resins are acid catalyzed condensation products of one or more aromatic alcohols and an aldehyde. The aromatic alcohol is a naphthol or a mixture comprising a naphthol and a phenol where the concentration of the naphthol relative to the phenol can vary within wide limits, dependent upon the desired properties of the copolymer. High concentrations of naphthol yield materials with higher melting temperatures. In general, polymers can be formed with the naphthol ranging between 100 and 5 mole percent of the aromatic alcohol mixture with the phenol comprising the balance. Where the naphthol resin is a copolymer, the preferred concentration of the naphthol, for purposes of this invention, ranges between about 5 and 50 mole percent of the aromatic alcohol mixture, and more preferably, between about 8 and 35 mole percent.

The naphthol resins are formed by condensing the aromatic alcohol with the aldehyde in the presence of a conventional acid catalyst. The concentration of the alcohol is slightly in excess of the alcohol and preferably, the molar ratio of the alcohol to the aldehyde is about 1 to 0.9. The naphthol resins are formed by mixing the reactants in a reactor and refluxing the mixture at an elevated temperature for a period of time sufficient to form a polymer of suitable molecular weight. In this respect, the polymers of this invention typically have a molecular weight ranging between about 500 and 10,000. Where the aromatic alcohol is a naphthol or predominantly a naphthol, especially a 2-naphthol, precaution must be taken to prevent gel formation.

The naphthol used in accordance with the invention conforms to the following general formula:

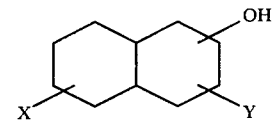

where the —OH radical is in the 1 or 2 position, and X and Y are preferably each members selected from the group of hydrogen, lower alkyl having from 1 to 4 carbon atoms, lower alkoxy having from 1 to 4 carbon atoms, halogen, hydroxyl or carboxyl. Preferably, each of X and Y is hydrogen. 1-naphthols are preferred as the reaction proceeds with greater ease yielding higher molecular weight polymers. The 2-naphthols are more likely to form gels if the reaction is not carefully controlled.

Where it is desired that the naphthol resin be a copolymer, the aromatic alcohol will comprise a mixture of the naphthol and a phenol. The phenol that may be used in combination with the naphthol is any of the phenols known to be useful in the formation of a Novolak resin. Such materials, by way of illustration only, include phenol itself, m-cresol, o-cresol, p-cresol, 2,4-xylenol, 2,5-xylenol, 3,4-xylenol, thymol, carvacrol, p-phenylphenol, and p-tert-butylphenol. The phenol can also comprise a mixture of phenols.

The catalyst used to effect the condensation reaction may be selected from among the mineral acids or organic carboxylic acids known to be useful for the formation of conventional Novolak resins. Typical catalysts for this purpose are oxalic acid, hydrochloric acid, p-toluene sulfonic acid, and the like. Oxalic acid is preferred. The amount of catalyst employed may range from 0.5 to 5 percent, by weight, based upon the weight of the aromatic compound present in the composition.

Condensation of the aromatic alcohol with the aldehyde may be effected in any conventional condensation apparatus, a reactor equipped with an agitator, means for reflux and distillation and conventional heat-transfer means being useful for performing the reaction. In general, a preferred method for carrying out the condensation reaction is to add the condensation agent (the aldehyde) to the aromatic alcohol containing the acid catalyst. The resultant mixture is agitated and heated to reflux over a time period ranging from about 2 to 24 hours, during which the aromatic alcohol and the aldehyde condense. The condensation reaction typically involves the formation of low molecular weight intermediates which initially form and then re-arrange and combine with each other at a later stage.

Following reflux, excess water is removed from the condensate and the residue vacuum distilled to complete the condensation reaction, thereby removing excess monomer while gradually heating to a temperature ranging from 200° C. to 300° C. Finally, the resultant resin is cooled to room temperature after being removed from the reactor.

In accordance with the invention, the naphthol resin is blended with a conventional Novolak resin. The Novolak resin used is any of the Novolak resins known to the art. In other words, the Novolak resins are the condensation products of an aldehyde and a phenol in the presence of an acid catalyst. The phenols identified above are exemplary of phenols used alone or in admixture with each other for the formation of the Novolak. Novolaks formed from o-cresols are preferred.

The ratio of the naphthol resin to the Novolak resin can vary within wide limits and is, in part, dependent upon the desired content of the repeating units derived from naphthol in the resin blend. Though the content of the repeating units from naphthol can vary from about 1 to 99 mole percent of the blend of the two resins, it preferably varies between about 5 to 50 mole percent of the blend, and more preferably, between about 8 and 35 mole percent of the blend. For purposes of illustration, to obtain a blend with a content of 25 mole percent repeating units derived from the naphthol, 25 percent of a homopolymer of naphthol would be blended with 75 percent of a Novolak resin. Alternatively, 50 mole percent of a copolymer formed from equal parts of naphthol and phenol can be blended with 50 mole percent of a novolak. Obviously, numerous other combinations are possible to achieve the desired 25 percent.

The method of forming the blend of the naphthol resin with the Novolak resin is conventional. The two resins, in finely divided powder form may be mixed with each other or alternatively, the resins may be dissolved in a common solvent and cast directly as a film or precipitated as an intimate mixture.

Examples of the present invention are set forth below where Examples 1 through 4 illustrate procedures for the formation of the naphthol resins and the remaining examples illustrate the blends of the invention.

EXAMPLE 1

A copolymer was prepared by reacting an aromatic alcohol mixture comprising 52.08 grams of m-cresol, 280.1 grams of o-cresol and 73.4 grams of 1-naphthol with 287.42 grams of a 34 percent formaldehyde solution in the presence of 7 grams of oxalic acid. The components were added to a reactor under a nitrogen purge, agitated, brought to reflux temperature and refluxed for a period of approximately 6½ hours at a temperature averaging about 90° C. Following reflux, excess water was removed from the condensation product by distillation, and the condensate heated to a temperature of about 200° C. under vacuum distillation for about 4 hours to complete the condensation reaction and remove unreacted monomers. The condensate was then removed from the reaction vessel and permitted to cool to room temperature. The polymer so formed had a melting point of about 114° C. and an average molecular weight of 3000.

The melt point for the above example, and for determining the melt points recited throughout this specification, was determined on a "hot bench" or "hot bar" apparatus. The apparatus consists of a stainless steel bar heated at one end to produce a temperature gradient along the length of the bar. A movable thermocouple provides the temperature along any point on the bar. Melt point is determined by spreading powdered resin along the heated bar. The temperature, considered the melt temperature, is recorded at the point on the bar where a powder/melt interface is observed.

EXAMPLE 2

The procedure of Example 1 was repeated but an aromatic alcohol comprising 212.2 grams of m-cresol and 76.4 grams of 1-naphthol was reacted with 196.4 grams of formaldehyde in the presence of 4.8 grams of oxalic acid. The reaction was continued for about 7 hours and the melting point of the final polymer was found to vary between about 155° C. and 160° C.

EXAMPLE 3

The procedure of Example 1 was repeated but the reaction mixture comprised an aromatic alcohol which was a mixture of 159.6 grams of m-cresol, 17 grams of 4-tert-butyl phenol and 97.9 grams of 1-naphthol. The aromatic alcohol was reacted with 171 grams of formaldehyde in the presence of 3 grams of oxalic acid. The reaction was continued for a period of about 12½ hours and the melt point of the resulting polymer was found to be 150° C.

EXAMPLE 4

A copolymer was prepared by reacting a mixture of aromatic alcohols which comprised 183.6 grams of m-cresol and 61.2 grams of 2-naphthol with 155.2 grams of formaldehyde in the presence of 4 grams of oxalic acid as catalyst. The reaction was continued for 4 hours at a reflux temperature of 96° to 98° C. followed by distillation to remove excess water. The maximum reaction temperature was 250° C. The resin was removed from the reactor after a total time of one hour above 200° C. A solid resin was obtained that melted at a temperature of about 155° C.

EXAMPLE 5

A blend of the naphthol resin of Example 1 with a Novolak resin may be formed by dissolving each in a common solvent. For example, to obtain a 50/50 mixture of a naphthol resin with a Novolak, 20 grams of each of the resin of Example 1 and a commercially available phenol formaldehyde resin identified as HRJ 1829 from Schenectady Chemical Company can be dissolved in 250 ml of methyl cellosolve acetate solvent and stirred. The resulting solution can be cast onto a substance and dried to yield a homogeneous cast film. Alternatively, dried powders of each could be blended or ground together, though the resultant mixture would not have the homogeneity of the film obtained from solution.

EXAMPLE 6

The procedure of Example 5 may be repeated substituting the resin of Example 2 for that of Example 1.

EXAMPLE 7

The procedure of Example 1 may be repeated using any of the following resin ratios:

| Example 1 Resin (gm) | Novolak Resin (gm) |
|---|---|
| 1 | 39 |
| 5 | 35 |
| 10 | 30 |
| 15 | 25 |
| 20 | 20 |
| 30 | 10 |
| 35 | 5 |
| 39 | 1 |

The resin mixtures of this invention may be used for any purposes for which film forming resins have been used in the past such as in paints, varnishes and lacquers. The blends may also be used as molding powders.

We claim:

1. A thermoplastic resin blend comprising a mixture of a naphthol resin and a novolak resin, said naphthol resin comprising the acid catalyzed reaction product resulting from the condensation of an aldehyde and an aromatic alcohol selected from the group of a naphthol and mixtures of naphthol and a phenol where the aromatic alcohol is in molar excess of said aldehyde, said blend containing sufficient naphthol resin whereby the content of repeating units derived from naphthol varies between 1 and 99 mole percent of the total resin blend.

2. The blend of claim 1 where the naphthol is a 1-naphthol.

3. The blend of claim 2 where the content of repeating units derived from naphthol in the blend varies between 5 and 50 mole percent.

4. The blend of claim 3 where the content of repeating units derived from naphthol varies between 8 and 35 mole percent.

5. The blend of claim 3 where the aromatic alcohol comprises from 5 to 95 mole percent of a naphthol and from 95 to 5 percent of a phenol.

6. The blend of claim 5 where the naphthol comprises from 5 to 50 mole percent and the phenol comprises the balance.

7. The blend of claim 5 where the naphthol comprises from 8 to 35 mole percent and the phenol comprises the balance.

8. The blend of claim 5 where the naphthol is an unsubstitued naphthol.

9. The blend of claim 5 where the naphthol is substituted with a member selected from the group of halo, alkyl having from 1 to 4 carbon atoms, hydroxyl and carboxyl.

10. The blend of claim 5 where the aromatic alcohol is a mixture of a naphthol and a phenol and the phenol is selected from the group of phenol, m-cresol, o-cresol, p-cresol, 2,4-xylenol, 2,5-xylenol, 3,4-xylenol, 3,5-xylenol, thymol, carvacrol, p-phenylphenol, p-tert-butylphenol and mixtures thereof.

11. The blend of claim 10 where the phenol is a cresol.

12. The blend of claim 10 where the phenol is a mixture of a cresol and p-tert-butylphenol.

13. The blend of claim 5 as a cast film.

14. The blend of claim 5 in the form of finely divided powders.